US 6,464,316 B1

(12) United States Patent
Askeland et al.

(10) Patent No.: US 6,464,316 B1
(45) Date of Patent: Oct. 15, 2002

(54) BI-DIRECTIONAL PRINTMODE FOR IMPROVED EDGE QUALITY

(75) Inventors: Ronald A. Askeland, San Diego, CA (US); Matthew D Giere, San Diego, CA (US); Clayton L. Holstun, San Marcos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/846,484

(22) Filed: Apr. 30, 2001

Related U.S. Application Data

(63) Continuation-in-part of application No. 09/562,264, filed on Apr. 29, 2000, now Pat. No. 6,247,787.

(51) Int. Cl.[7] .................................................. B41J 29/38
(52) U.S. Cl. ............................................. 347/9; 347/14
(58) Field of Search ................................ 347/9, 37, 14

(56) References Cited

U.S. PATENT DOCUMENTS

| | | | | |
|---|---|---|---|---|
| 5,661,507 A | * | 8/1997 | Sperry | 347/40 |
| 6,113,290 A | * | 9/2000 | Tanaka et al. | 400/61 |
| 6,419,339 B2 | * | 7/2002 | Takahashi | 347/14 |

* cited by examiner

Primary Examiner—Thinh Nguyen
(74) Attorney, Agent, or Firm—Dennis G. Stenstrom

(57) ABSTRACT

A method for incremental printing with an inkjet swath printer by ejecting drops of an ink from a printhead while scanning the printhead over a print medium, including determining a first edge and a second edge of each pixel in each row with respect to a first scanning direction. Moving the printhead in the first scanning direction while ejecting the drops of ink on the first edge of the pixels at a first firing frequency and on the second edge of the pixels at a second firing frequency and moving the printhead in a second direction opposite to the first scanning direction while ejecting the drops of ink on the second edge of the pixels at the first firing frequency and on the first edge of the pixels at the second firing frequency. Also a printing system for ejecting ink drops onto a medium, which includes a mechanism for scanning a carriage through a print zone over the medium, a printhead mounted on the carriage, the printhead having ink firing elements for ejecting an ink, and a controller for determining a first edge an d a second edge of each pixel in each row with respect to a first scanning direction; the controller causing the carriage to scan the printhead in a first scanning direction while ejecting the drops of ink on the first edge of the pixels at a first firing frequency and on the second edge of the pixels at a second firing frequency; and the controller causing the carriage to scan the printhead in a second scanning direction opposite to the first scanning direction while ejecting the drops of ink on the second edge of the pixels at the first firing frequency and on the first edge of the pixels at the second firing frequency.

20 Claims, 9 Drawing Sheets

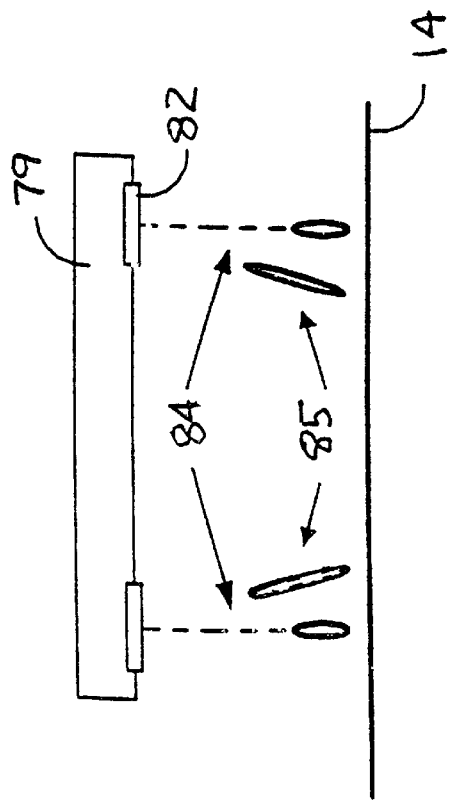
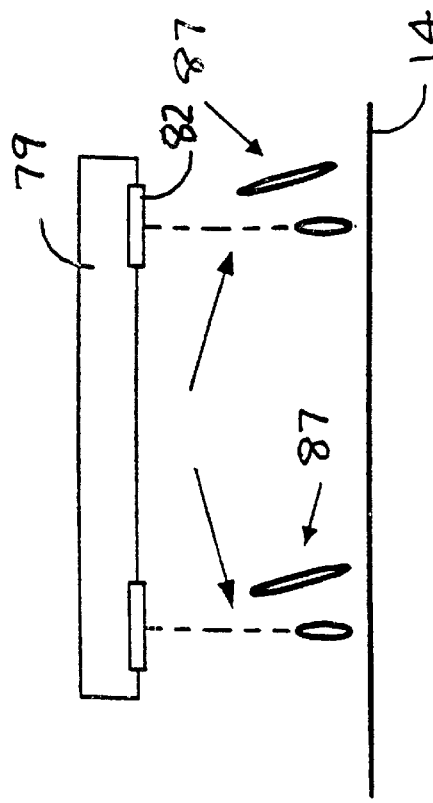

BI-DIRECTIONAL PRINTMODE FOR IMPROVED EDGE QUALITY

CROSS-REFERENCE TO RELATED APPLICATIONS

This application is a continuation-in-part of U.S. patent application Ser. No. 09/562,264, filed Apr. 29, 2000 now U.S. Pat. No. 6,247,787, entitled "Print Mode for Improved Leading and Trailing Edges and Text Print Quality." The foregoing commonly assigned patent application is herein incorporated by reference.

FIELD OF THE INVENTION

This invention relates to thermal inkjet printers, and more particularly to printmodes.

BACKGROUND OF THE INVENTION

Thermal inkjet hardcopy devices such as printers, graphics plotters, facsimile machines and copiers have gained wide acceptance. These hardcopy devices are described by W. J. Lloyd and H. T. Taub in "Ink Jet Devices," Chapter 13 of *Output Hardcopy Devices* (Ed. R.C. Durbeck and S. Sherr, San Diego: Academic Press, 1988). The basics of this technology are further disclosed in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994)], incorporated herein by reference. Inkjet hardcopy devices produce high quality print, are compact and portable, and print quickly and quietly because only ink strikes the paper.

An inkjet printer forms a printed image by printing a pattern of individual dots at particular locations of an array defined for the printing medium. The locations are conveniently visualized as being small dots in a rectilinear array. The locations are sometimes "dot locations", "dot positions", or pixels". Thus, the printing operation can be viewed as the filling of a pattern of dot locations with dots of ink.

Inkjet hardcopy devices print dots by ejecting very small drops of ink onto the print medium and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

The typical inkjet printhead (i.e., the silicon substrate, structures built on the substrate, and connections to the substrate) uses liquid ink (i.e., dissolved colorants or pigments dispersed in a solvent). It has an array of precisely formed orifices or nozzles attached to a printhead substrate that incorporates an array of ink ejection chambers which receive liquid ink from the ink reservoir. Each chamber is located opposite the nozzle so ink can collect between it and the nozzle, and has a firing resistor located in the chamber. The ejection of ink droplets is typically under the control of a microprocessor, the signals of which are conveyed by electrical traces to the resistor elements. When electric printing pulses heat the inkjet firing chamber resistor, a small portion of the ink next to it vaporizes and ejects a drop of ink from the printhead. Properly arranged nozzles form a dot matrix pattern. Properly sequencing the operation of each nozzle causes characters or images to be printed upon the paper as the printhead moves past the paper.

In an inkjet printhead the ink is fed from an ink reservoir integral to the printhead or an "off-axis" ink reservoir which feeds ink to the printhead via tubes connecting the printhead and reservoir. Ink is then fed to the various vaporization chambers either through an elongated hole formed in the center of the bottom of the substrate, "center feed", or around the outer edges of the substrate, "edge feed."

The ink cartridge containing the nozzles is moved repeatedly across the width of the medium to be printed upon. At each of a designated number of increments of this movement across the medium, each of the resistors is caused either to eject ink or to refrain from ejecting ink according to the program output of the controlling microprocessor. Each completed movement across the medium can print a swath approximately as high as the number of nozzles arranged in a column of the ink cartridge multiplied times the distance between nozzle centers. After each such completed movement or swath the medium is moved forward the height of the swath or a fraction thereof, and the ink cartridge begins the next swath. By proper selection and timing of the signals, the desired print is obtained on the medium.

Lines, text and graphics are normally printed with uniform density. In one or two pass printmodes, this results in a high firing frequency for black and saturated colors. High firing frequency has a negative effect on the drops that are ejected: drop velocity, drop volume, drop shape and drop trajectory. Output printed with high frequency and uniform density text and lines exhibits defects that are the result of the sub-optimal firing conditions. Inkjet printheads often have frequency dependant drop defects, such as spray, spear drops and tails. The effects of these drop defects on image quality can vary with scan direction due to aerodynamics, burst length (number of drops fired in a row at high frequency) and other factors. A previous approach to this problem uses image processing to improve edge quality by reducing the firing frequency at the edges of lines and text characters. See, U.S. patent application Ser. No. 09/562,264, filed April 29, 2000, entitled "Print Mode for Improved Leading and Trailing Edges and Text Print Quality." This method is effective, but requires image processing which can be expensive or time consuming.

Accordingly, there is a need for a new solution to the problem of text and graphics degradation and, more generally, edge roughness that is associated with high frequency firing.

SUMMARY OF THE INVENTION

This invention increases text, line and graphics quality by reducing edge roughness caused by defects such as tails, spray or spear drops. A method for incremental printing with an inkjet swath printer by ejecting drops of an ink from a printhead while scanning the printhead over a print medium, including determining a first edge and a second edge of each pixel in each row with respect to a first scanning direction. Moving the printhead in the first scanning direction while ejecting the drops of ink on the first edge of the pixels at a first firing frequency and on the second edge of the pixels at a second firing frequency and moving the printhead in a second direction opposite to the first scanning direction while ejecting the drops of ink on the second edge of the pixels at the first firing frequency and on the first edge of the pixels at the second firing frequency.

BRIEF DESCRIPTION OF THE DRAWINGS

FIGS. 6A and 6B are illustrative pictorial diagrams showing a magnified view of ink drops ejected from a printhead.

DETAILED DESCRIPTION OF A PREFERRED EMBODIMENT

While the present invention will be described below in the context of an off-axis printer having an external ink source, it should be apparent that the present invention is also useful in an inkjet printer which uses inkjet print cartridges having an ink reservoir integral with the print cartridge.

Figure 1:
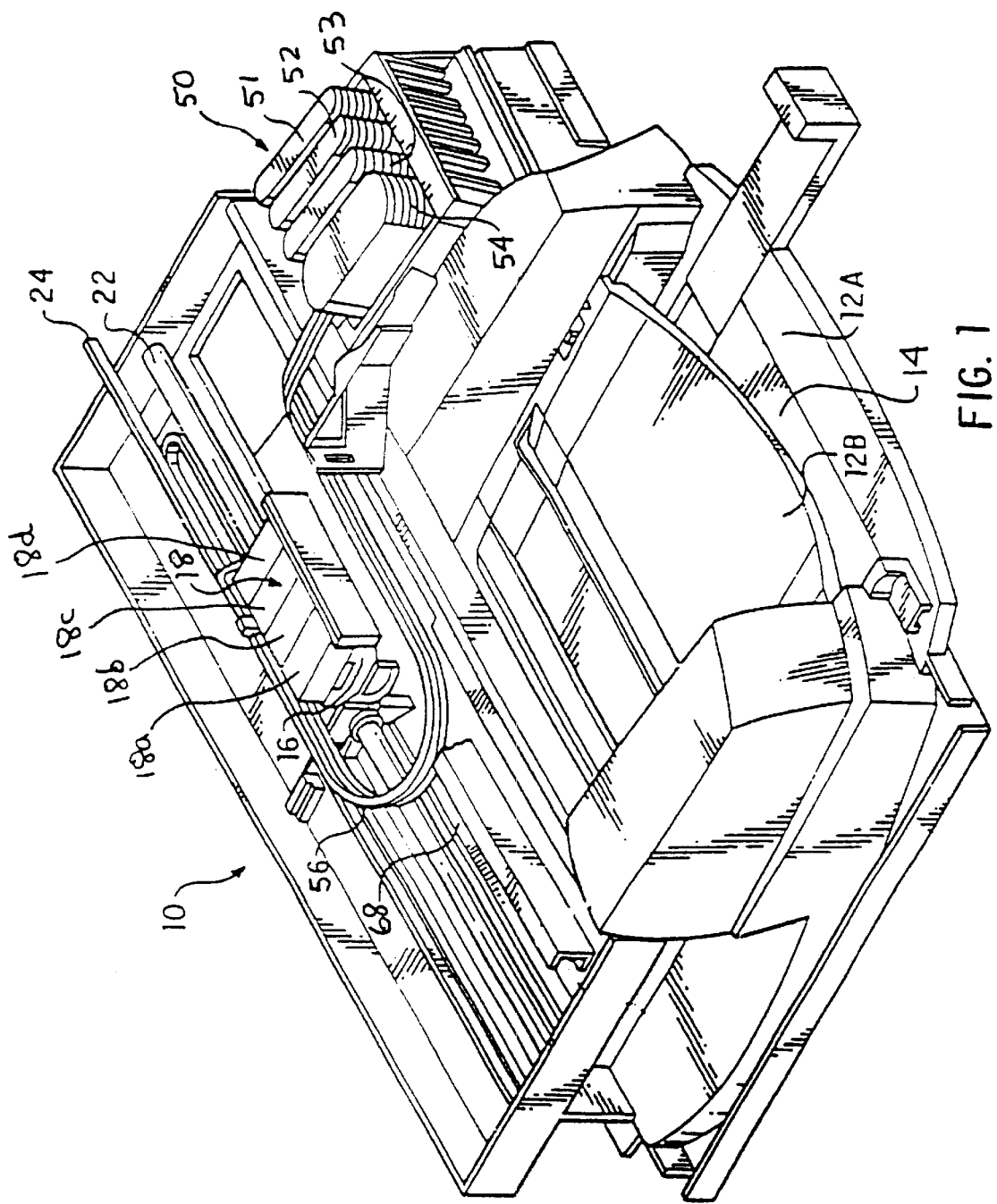
FIG. 1 is a perspective view of one embodiment of an inkjet printer incorporating the present invention.

FIG. 1 is a perspective view of one embodiment of an inkjet printer 10 suitable for utilizing the present invention, with its cover removed. Generally, printer 10 includes a tray 12 for holding media 14. When a printing operation is initiated, a sheet of media 14 from tray 12A is fed into printer 10 using a sheet feeder, then brought around in a U direction to now travel in the opposite direction toward tray 12B. A carriage unit 16 supports and carries a set of removably mounted print cartridges 18. The carriage 16 is supported from below on a slide rod 22 that permits the carriage 16 to move under the directing force of a carriage mechanism. The media is stopped in a print zone 68 and the scanning carriage 16 is scanned across the media 14 for printing a swath of ink thereon. The printing may occur while the carriage is scanning in either directional. This is referred to as bi-directional printing. After a single scan or multiple scans, the media 14 is then incrementally shifted using a conventional stepper motor and feed rollers to a next position within the print zone 68 and carriage 16 again scans across the media 14 for printing a next swath of ink. When the printing on the media is complete, the media is forwarded to a position above tray 12B, held in that position to ensure the ink is dry, and then released.

The carriage scanning mechanism may be conventional and generally includes a slide rod 22, along which carriage 16 slides, a flexible circuit (not shown in FIG. 1) for transmitting electrical signals from the printer's microprocessor to the carriage 16 and print cartridges 18 and a coded strip 24 which is optically detected by a photo detector in carriage 16 for precisely positioning carriage 16. A stepper motor (not shown), connected to carriage 16 using a conventional drive belt and pulley arrangement, is used for transporting carriage 16 across the print zone 68.

The features of inkjet printer 10 include an ink delivery system for providing ink to the print cartridges 18 and ultimately to the ink ejection chambers in the printheads from an off-axis ink supply station 50 containing replaceable ink supply cartridges 51, 52, 53, and 54, which may be pressurized or at atmospheric pressure. For color printers, there will typically be a separate ink supply cartridge for black ink, yellow ink, magenta ink, and cyan ink. Four tubes 56 carry ink from the four replaceable ink supply cartridges 51–54 to the print cartridges 18.

The carriage 16 holds a set of ink cartridges 18 that incorporate a black print cartridge 18a, and a set of color ink print cartridges 18b–18d for the colors of cyan, magenta, and yellow, respectively. The print cartridges each incorporate a black ink printhead 79a, and a set of color ink printheads 79b–79d for the colors of cyan, magenta, and yellow, respectively. Each of the printheads may be like printhead 79 shown in FIG. 2. Each of the printheads 79a–79d includes a plurality of inkjet nozzles 82 for ejecting the ink droplets that form the textual and object images in a given page of information.

In operation, the printer 10 responds to commands by printing full color or black print images on the print medium 14 which is mechanically retrieved from the feed tray 12A. The printer 10 operates in a multi-pass print mode to cause one or more swaths of ink droplets to be ejected onto the printing medium 14 to form a desired image. Each swath is formed in a pattern of individual dots that are deposited at particular pixel locations in an N by M array defined for the printing medium. The pixel locations are conveniently visualized as being small ink droplet receiving areas grouped in a matrix array.

Figure 2:
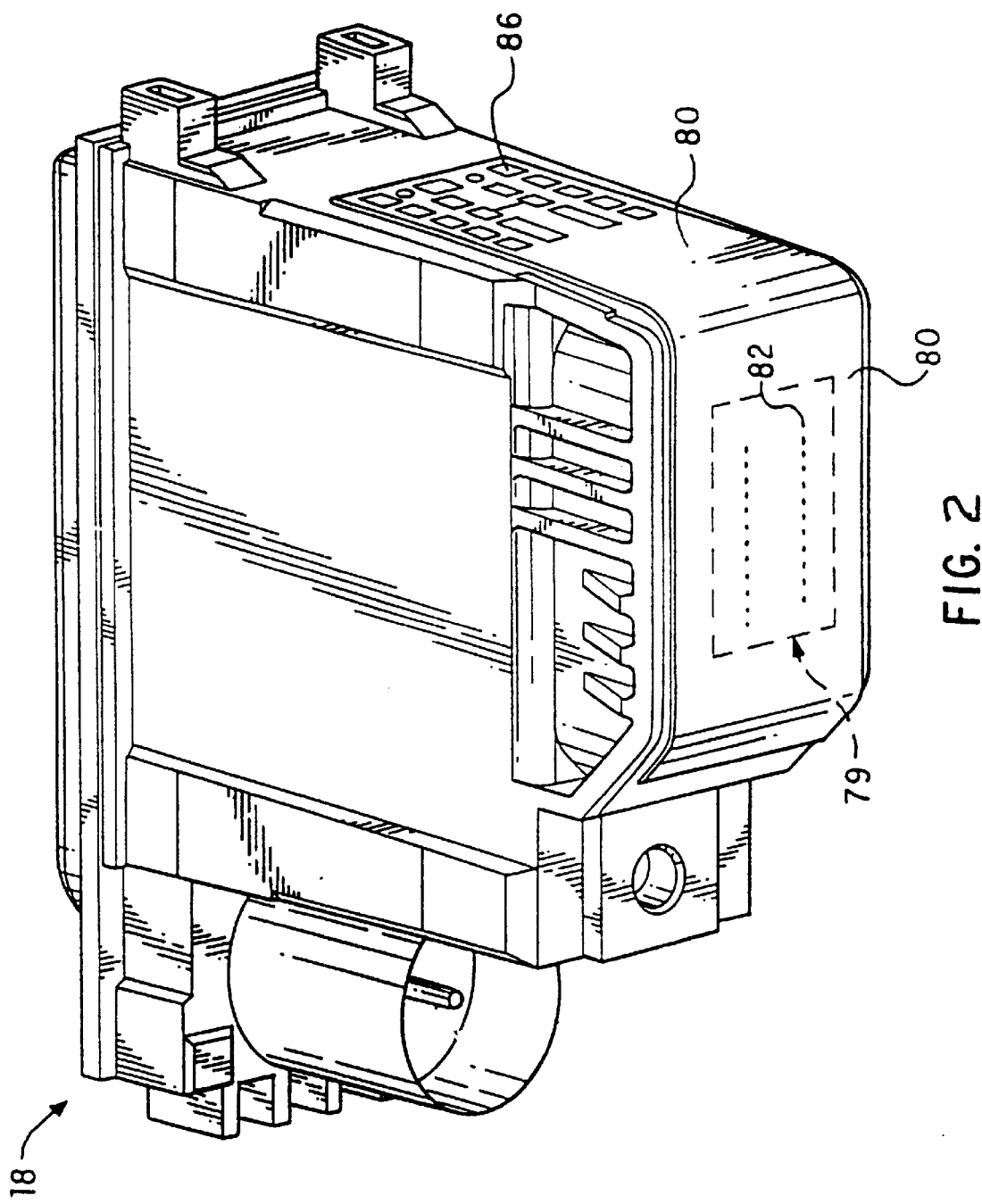
FIG. 2 is a bottom perspective view a single print cartridge.

Referring to FIG. 2, a flexible circuit 80 containing contact pads 86 is secured to print cartridge 18. Contact pads 86 align with and electrically contact printer electrodes on carriage 16 (not shown) when print cartridge 18 is installed in printer 10 to transfer externally generated energization signals to printhead assembly 79. Flexible circuit 80 has a nozzle array consisting of two rows of nozzles 82 which are laser ablated through flexible circuit 80. Mounted on the back surface of flexible circuit 80 is a silicon substrate (not shown). The substrate includes a plurality of ink ejection chambers with individually energizable ink ejection elements therein, each of which is located generally behind a single orifice or nozzle 82. The substrate includes a barrier layer which defines the geometry of the ink ejection chambers and ink channels formed therein. The ink channels are in fluidic communication ink ejection chambers and with an ink reservoir. The back surface of flexible circuit 80 includes conductive traces formed thereon. These conductive traces terminate in contact pads 86 on a front surface of flexible circuit 80. The other ends of the conductive traces are bonded to electrodes on the substrate.

Further details on printhead design and electronic control of inkjet printheads are described in U.S. patent application Ser. No. 09/240,177, filed Jan. 30, 1999, entitled "Ink Ejection Element Firing Order to Minimize Horizontal Banding and the Jaggedness of Vertical Lines;" U.S. patent application Ser. No. 09/016,478, filed Jan. 30, 1998, entitled "Hybrid Multi-Drop/Multi-Pass Printing System;" U.S. patent application Ser. No. 08/962,031, filed Oct. 31, 1997, entitled "Ink Delivery System for High Speed Printing;" U.S. patent application Ser. No. 08/608,376, filed Feb. 28, 1996, entitled "Reliable High Performance Drop Generator For An Inkjet Printhead;" U.S. patent application Ser. No. 09/071,138, filed Apr. 30, 1998, entitled "Energy Control Method for an Inkjet Print Cartridge;" U.S. patent application Ser. No. 08/958,951, filed Oct. 28, 1997, entitled "Thermal Ink Jet Print Head and Printer Energy Control Apparatus and Method;" and U.S. Pat. No. 5,648,805, entitled "Inkjet Printhead Architecture for High Speed and High Resolution Printing;" The foregoing commonly assigned patent applications are herein incorporated by reference.

Figure 3:
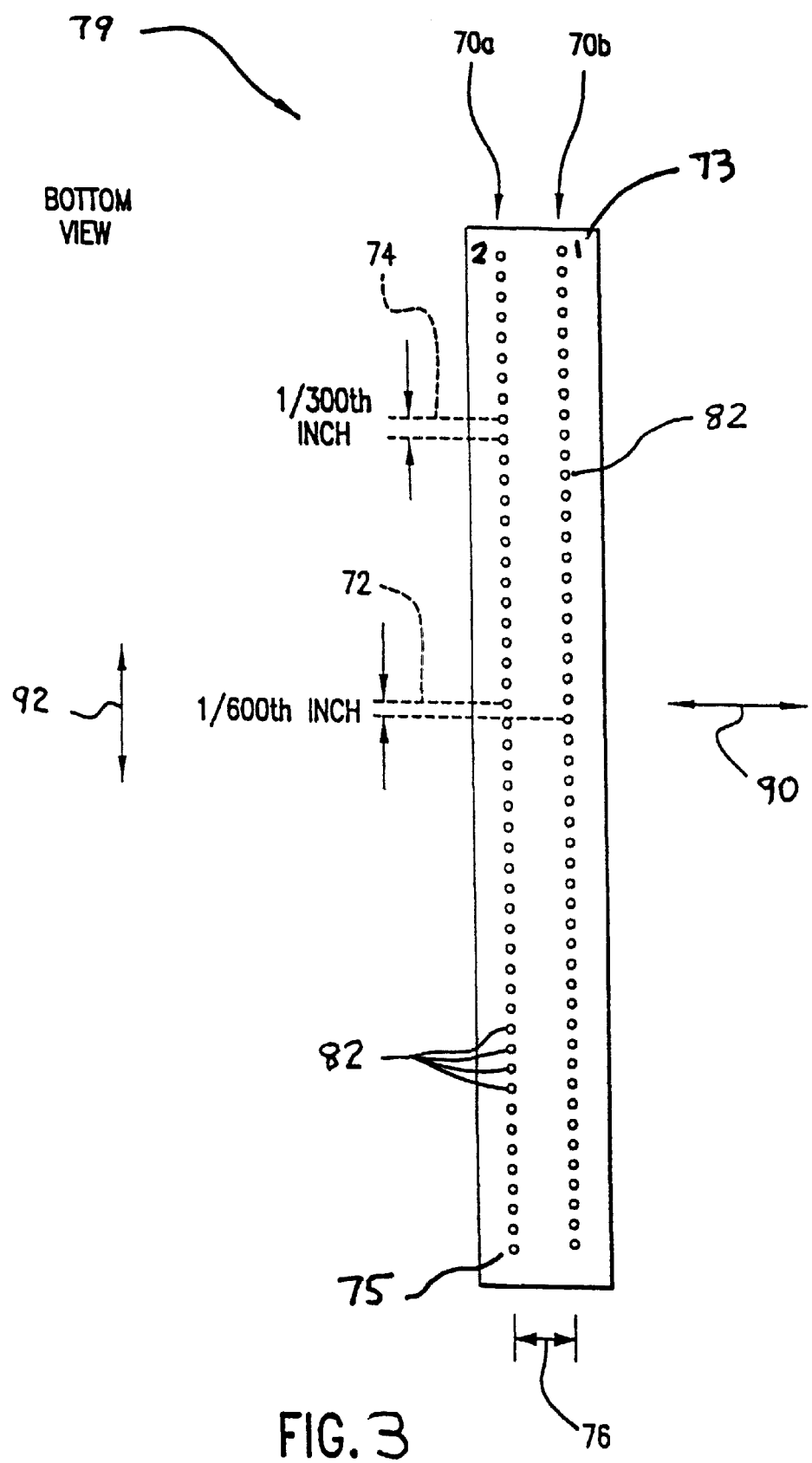
FIG. 3 is a schematic diagram of the nozzle arrangement of the printhead of FIG. 2.

Referring to FIG. 3, a preferred embodiment of a printhead 79 has two vertical columns 70a–b of nozzles which, when the printhead 79 is installed in the printer 10, are perpendicular to the scan or transverse direction 90. The columnar vertical spacing 74 between adjacent nozzles in a column is typically 1/300 th inch in present-day printheads. However, by using two columns instead of one and logically treating the nozzles as a single column, the effective vertical spacing 72 between logical nozzles is reduced to 1/600 th inch, thus achieving improved printing resolution in the direction of the media advance direction 92. As an illustration, the print controller 32 would print a vertical column of 1/600 th inch pixel locations on the print medium 18 by depositing ink from column 70a, then moving the printhead 79 in the scan direction 90 the inter-column distance 76 before depositing ink from column 70b.

For purposes of clarity, the nozzles 82 are conventionally assigned a number starting at the top right 73 as the printhead assembly as viewed from the bottom of the printhead assembly 79 and ending in the lower left 75, thereby resulting in the odd numbered nozzles being arranged in one column 70b and even numbered nozzles being arranged in the other column 70a. Of course, other numbering conventions may be followed, but the description of the firing order of the nozzles 82 and ink ejection elements associated with this numbering system has advantages. One such advantage is that a row number is printed by the nozzle having the same nozzle number as the row number.

As an illustration, the print controller 32 would print a vertical column of 1/600 th inch pixel locations on the print medium 14 by depositing ink from one column 70a or 70b of the nozzle array, then move the printhead 79 in the scan direction 90 the inter-column distance 76 before depositing ink from the other column.

Figure 4:
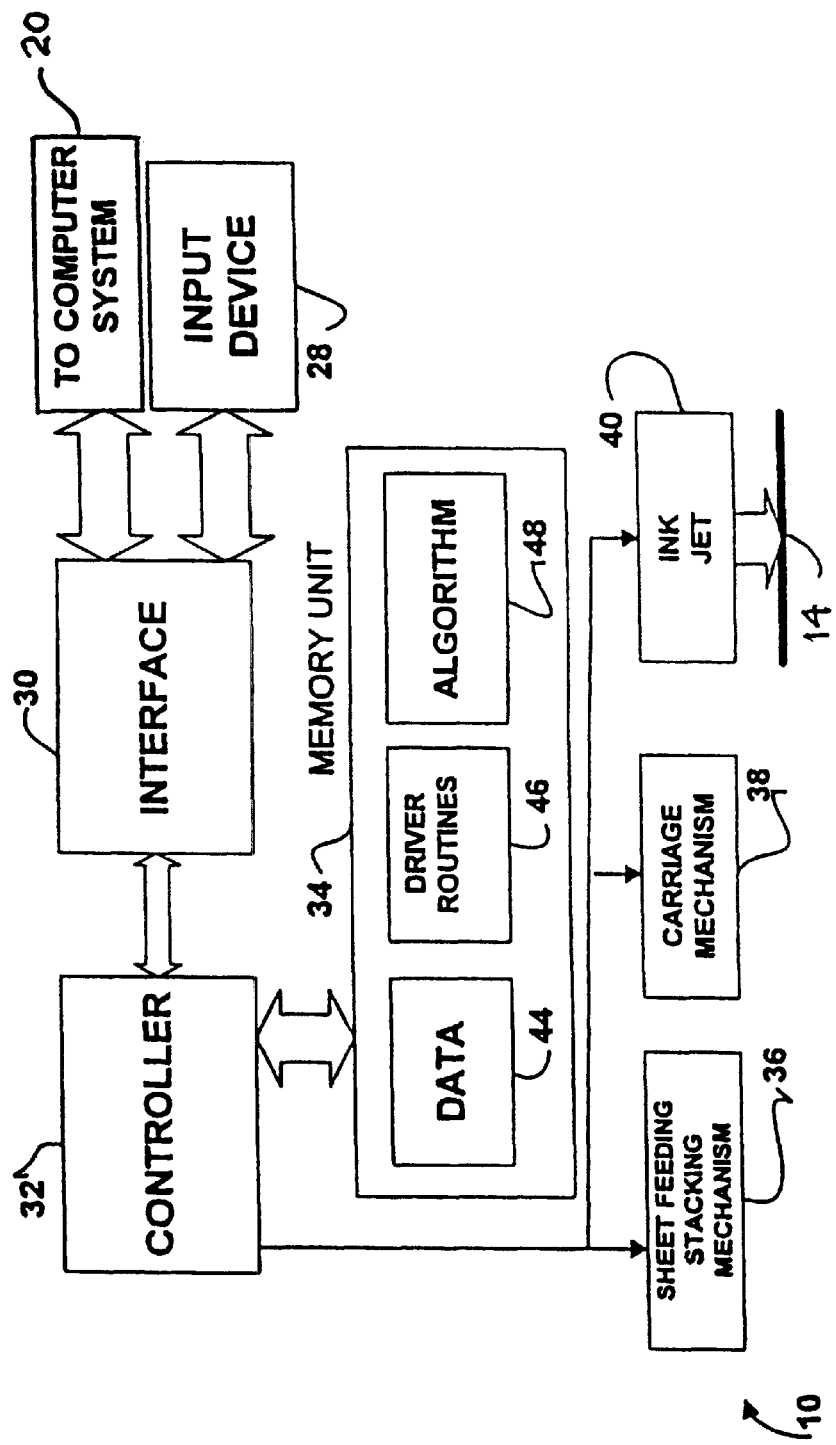
FIG. 4 is a block diagram of the hardware components of the inkjet printer of FIG. 1.

Considering now the printer 10 in greater detail with reference to FIGS. 1 and 4, the printer 10 generally includes a controller 32 that is coupled to a computer system 20 via an interface unit 30. The interface unit 30 facilitates the transferring of data and command signals to the controller 32 for printing purposes. The interface unit 30 also enables the printer 10 to be coupled electrically to an input device 28 for the purpose of downloading print image information to be printed on a print medium 14. Input device 28 can be any type peripheral device that can be coupled directly to the printer 10.

In order to store the data, the printer 10 further includes a memory unit 34. The memory unit 34 is divided into a plurality of storage areas that facilitate printer operations. The storage areas include a data storage area 44; a storage area for driver routines 46; and a control storage area 48 that holds the algorithms that facilitate the mechanical control implementation of the various mechanical mechanisms of the printer 10.

The data storage area 44 receives the data profile files that define the individual pixel values that are to be printed to form a desired object or textual image on the medium 14. The storage area 46 contains printer driver routines. The control storage area 48 contains the routines that control 1) a sheet feeding stacking mechanism for moving a medium through the printer from a supply or feed tray 12A to an output tray 12B; and 2) a carriage mechanism that causes a printhead carriage unit 16 to be moved across a print medium on a guide rod 22. In operation, the high speed inkjet printer 10 responds to commands by printing full color or black print images on the print medium which is mechanically retrieved from the feed tray 12A.

The specific partial-inking pattern employed in each pass, and the way in which these different patterns add up to a single fully inked image, is known as a "printmode." Printmodes allow a trade-off between speed and image quality. For example, a printer's draft mode provides the user with readable text as quickly as possible. Presentation, also known as best mode, is slow but produces the highest image quality. Normal mode is a compromise between draft and presentation modes. Printmodes allow the user to choose between these trade-offs. It also allows the printer to control several factors during printing that influence image quality, including: 1) the amount of ink placed on the media per dot location, 2) the speed with which the ink is placed, and, 3) the number of passes required to complete the image. Providing different printmodes to allow placing ink drops in multiple swaths can help with hiding nozzle defects. Different printmodes are also employed depending on the media type.

One-pass mode operation is used for increased throughput on plain paper. Use of this mode on other papers will result in too large of dots on coated papers, and ink coalescence on polyester media. In a one-pass mode, all dots to be fired on a given row of dots are placed on the medium in one swath of the printhead, and then the print medium is advanced into position for the next swath. A two-pass printmode is a print pattern wherein one-half of the dots available for a given row of available dots per swath are printed on each pass of the printhead, so two passes are needed to complete the printing for a given row. Similarly, a four-pass mode is a print pattern wherein one fourth of the dots for a given row are printed on each pass of the printhead ad. In a printmode of a certain number of passes, each pass should print, of all the ink drops to be printed, a fraction equal roughly to the reciprocal of the number of passes.

A printmode usually encompasses a description of a "printmask," or several printmasks, used in a repeated sequence and the number of passes required to reach "full density," and also the number of drops per pixel defining what is meant by full density. The pattern used in printing each nozzle section is known as "printmask." A printmask is a binary pattern that determines exactly which ink drops are printed in a given pass or, to put the same thing in another way, which passes are used to print each pixel. In addition, the printmask determines which nozzle will be used to print each pixel location. Thus, the printmask defines both the pass and the nozzle which will be used to print each pixel location, i.e., each row number and column number on the media. The printmask can be used to "mix up" the nozzles used, as between passes, in such a way as to reduce undesirable visible printing artifacts.

The printer 10 operates in a multi-pass print mode to cause one or more swaths of ink droplets to be ejected onto the printing medium to form a desired image. Each swath is formed in a pattern of individual dots that are deposited at particular pixel locations in an N by M array defined for the printing medium. The pixel locations are conveniently visualized as being small ink droplet receiving areas grouped in a matrix array.

A print controller 32 controls the carriage 16 and media 14 movements and activates the nozzles 82 for ink drop deposition. By combining the relative movement of the carriage 16 along the scan direction 90 with the relative movement of the print medium 14 along the medium advance direction 92, each printhead 79 can deposit one or more drops of ink at each individual one of the pixel locations on the print medium 14. A printmask is used by the print controller 32 to govern the deposition of ink drops from the printhead 79. Typically a separate printmask exists for each discrete intensity level of color (e.g. light to dark) supported by the printer 10. For each pixel position in a row during an individual printing pass, the printmask has a mask pattern which both (a) acts to enable the nozzle positioned adjacent the row to print, or disable that nozzle from printing, on that pixel location, and (b) defines the number of drops to be deposited from enabled nozzles. Whether or not the pixel will actually be printed on by the corresponding enabled nozzle depends on whether the image data to be printed requires a pixel of that ink color in that pixel location. The printmask is typically implemented in firmware in the printer 10, although it can be alternatively implemented in a software driver in a computing processor (not shown) external to the printer.

The term "printing pass", as used herein, refers to those passes in which the printhead is enabled for printing as the nozzle arrangement moves relative to the medium 14 in the scan direction 90; in a bi-directional printer, each forward and rearward pass along the scan direction 90 can be a printing pass, while in a unidirectional printer printing passes can occur in only one of the directions of movement. In a given pass of the carriage 16 over the print medium 14 in a multi-pass printer 10, only certain pixel locations enabled by the printmask can be printed, and the printer 10 deposits the number of drops specified by the printmask for the corresponding pixel locations if the image data so requires. The printmask pattern is such that additional drops for the certain pixel locations, as well as drops for other pixel locations in the swath, are filled in during other printing passes.

Figure 5:
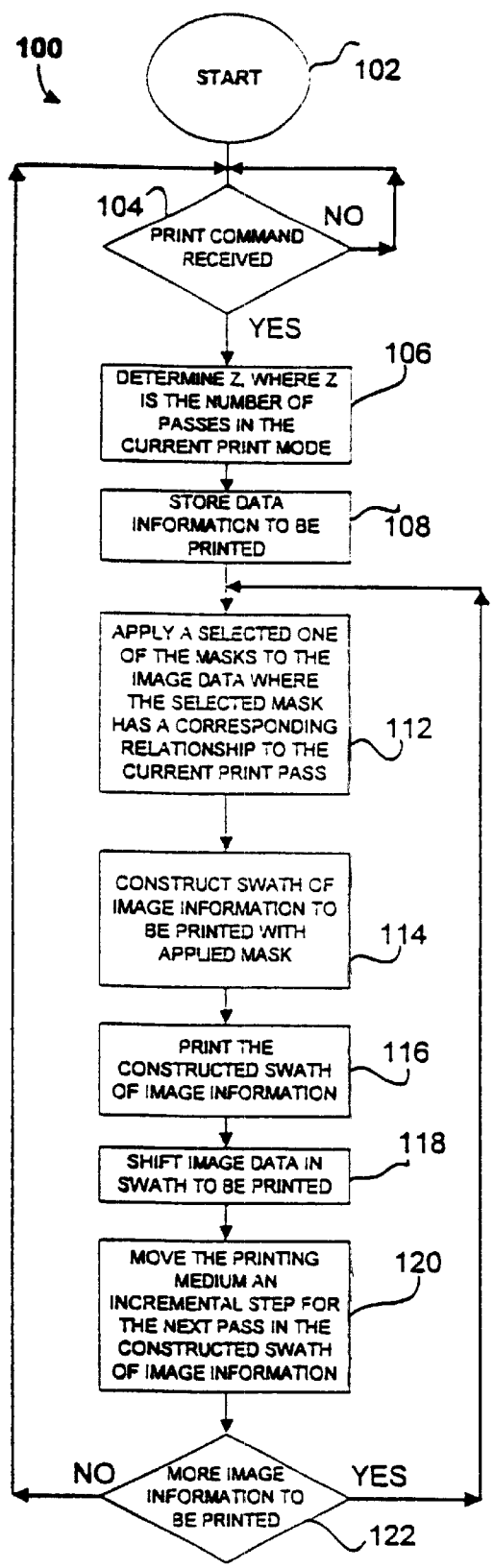
FIG. 5 is a flow chart showing the general steps performed by the printer controller in applying a printmask.

Referring to FIG. 5, the control algorithm 100 is stored in the memory unit 34 and applied by the controller 32 to the image information to be printed. The number of printmasks that are applied via the algorithm 100, to any given area of image data is dependent upon the number of passes employed in a multi-pass print mode. For example, in a two-pass print mode, two printmasks are required. In a four-pass print mode, four printmasks are required. It should be understood that the same printmasks may be utilized for all color planes, or different generated printmasks for each color plane. The number of passes, Z, for printing an image is between about 2 passes and about 16 passes. A more preferred value for Z is between about 3 and about 8, while the most preferred value for Z is about 4.

Control algorithm program 100 begins at a start command 102 when power is applied to the controller 32. The program then proceeds to a decision command 104 to wait for a print command from the computer system 20. In this regard, if no print command is received, the controller 32 loops at the decision step 104 until the print command is received.

After determining the number of passes in the current print mode, the program proceeds to a command step 108 that causes the controller 32 to store in the memory unit data area 44, the information to be printed.

Considering again the control program 100, after step 112 has been performed, the program advances to a command step 114 that causes the swath to be constructed. Next, the program proceeds to a command step 116 that causes swath of image information to be printed.

After the swath of image information has been printed, the program then goes to a command step 118 that causes the image data to be shifted in anticipation of printing that portion of image information to be printed during the next pass of the printing operation.

The program then advances to a command step 120 that causes the printing medium 14 to be advanced incrementally in preparation of printing the next portion of image information.

The program then proceeds to a determination step 122 to determine whether additional image information is to be printed. If additional image information is to be printed the program go to the command step 112 and proceeds as described previously. If no additional image information is to be printed the programs advances to the determination step 104 and waits for the next print command to be received.

It should be understood by those skilled in the art that a different printmask is applied each time the program executes the command step 112. Although a different printmask is applied in each pass, it should be understood by those skilled in the art, that the same printmask is applied for each same numbered pass in each swath to be printed. Thus for example, in a four-pass print mode, printmask number one is applied to the first pass of each four pass sequence, while printmask number four is applied to the last pass in each four pass sequence. In this manner, the same printmasks are uniformly applied on a swath by swath basis to the image information to be printed. The total number of printmasks that are applied in the formation of the desired image to be printed is determined by the total number of passes that will be made to form the image. There is no intention therefore to limit the scope of the number of printmasks applied to any fixed number.

Image data from the computer system 20 generally is sent to the printing system 10 at resolutions such as 75, 150, 300, or 600 dots per inch (dpi) resolution. However, it is often advantageous to print at a higher resolution that is an integer multiple of the image data resolution, such as 600, 900, 1200, 1800 or 2400 dpi resolution. This often referred to as an "expansion." It is often convenient to view the data resolution as a "pixel" and the expanded resolution as "sub-pixels." Sub-pixel resolution=pixel resolution * n, where n=1, 2, 3, 4, etc. In addition, printers usually have a "fundamental" resolution which is the smallest increment the printer can store information and "hit " a location on the print media. This resolution is usually quite high, such as 7200 dpi. The sub-pixel resolution=fundamental resolution / n, where n=1, 2, 3, 4, etc. See U.S. patent application Ser. No. 09/016,478, filed Jan. 30, 1998, entitled "Hybrid Multi-Drop/Multi-Pass Printing System." which is herein incorporated by reference.

The firing frequency is the frequency required to eject one drop per sub-pixel at the scanning carriage speed. The relationship between the firing frequency F in kHz, the scanning carriage speed in inches per second and the resolution or sub-pixel size in dots per inch is defined by the following equation:

Firing Frequency (kHz)=[Carriage Speed (inches/sec)] * [Sub-pixel Resolution (dots/inch)]

Lines, text and graphics are normally printed with uniform density. In one-pass or two-pass printmodes, this requires a high firing frequency for black and saturated colors. High firing frequency has a negative effect on the drop velocity, drop volume, drop shape and drop trajectory of the drops ejected. Output printed with high frequency and uniform density text and lines exhibits defects that are the result of the sub-optimal firing conditions caused by firing at high frequency. Accordingly, there is a need for a solution to the problem of text and graphics degradation and edge roughness that is associated with high frequency firing. The present invention provides dramatically improved edge roughness and text print quality without the need for changing any aspect of the pen architecture (drop weight, refill speed, directionality), the print resolution, or print throughput.

Inkjet printers typically operate by firing a single drop, or by firing many drops in succession. Each drop fired has an effective firing frequency equal to 1/(time since the firing of the previous drop). Thus, the effective firing frequency of the first drop in a string of drops in succession is lower. Such drops typically have good trajectories and good shapes. The effective firing frequency of all remaining drops in a string of drops is higher. Such drops typically have poorer trajectories and poorer shapes. This causes the appearance of a slight blurring, irregularity or dirtiness of the leading and trailing edges of what has been printed. This will continue to be the case until the firing is interrupted, and the system has time to stabilize. This process will then repeat.

FIGS. 6A and 6B are illustrative pictorial diagrams showing a magnified view of ink drops ejected from the nozzle 82 of a printhead 79. Typically, lines, text and graphics produced by the inkjet printhead 79 are usually printed with all nozzles 82 of the printhead 79 aligned in the scan (horizontal) direction. During a high frequency printing operation, a set of normal drops 84 are ejected together with associated several systematic defective drops, such as tails and spray 87 or spear drops 87. The associated systematic defective drops can cause rough edges that degrade the quality of the printout onto media 14. The defective drops are usually created when certain types of printheads are fired at high frequencies, such as 36 kHz. As shown in FIG. 6A, spear drops 85 typically have an odd/even nozzle trajectory error, i.e. the nozzles 82 of the printhead 79 typically eject the spear drops 85 toward the center of the printhead 79 independent of the scanning direction 90 so that the media 14 receives spattered or rough edges of lines and text printouts. As shown in FIG. 6B, tails and spray 87 typically are low velocity and land on the media 14 downstream from the normal drop 84 and are thus dependent of the scanning direction 90. The basic solution is to improve line, text and graphics quality by printing nozzles 82 at low frequency at the edge of a line or text character.

In a previous to U.S. patent application Ser. No. 09/562, 264, filed Apr. 29, 2000, entitled "Print Mode for Improved Leading and Trailing Edges and Text Print Quality." it was shown that edge quality can be dramatically improved by removing dots immediately before the edge of a line or text character. One disadvantage of this approach is that it requires edge detection and image processing.

Figure 7:
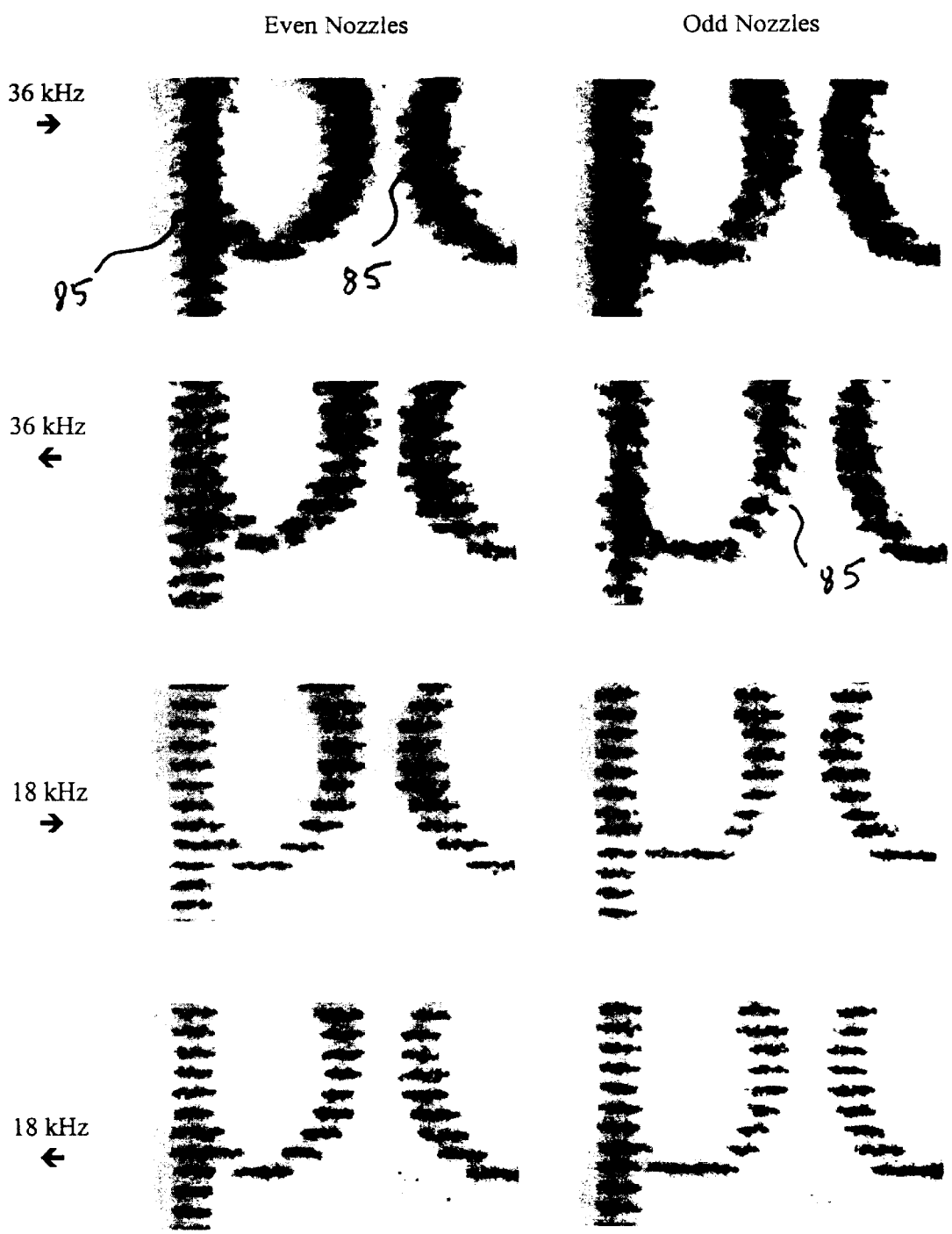
FIG. 7 is a highly magnified photomicrograph of text printed by a printhead in a single pass of a bi-directional printmode showing images in the left column printed with the even nozzles and images in the right column printed with the odd nozzles.
Figure 8:
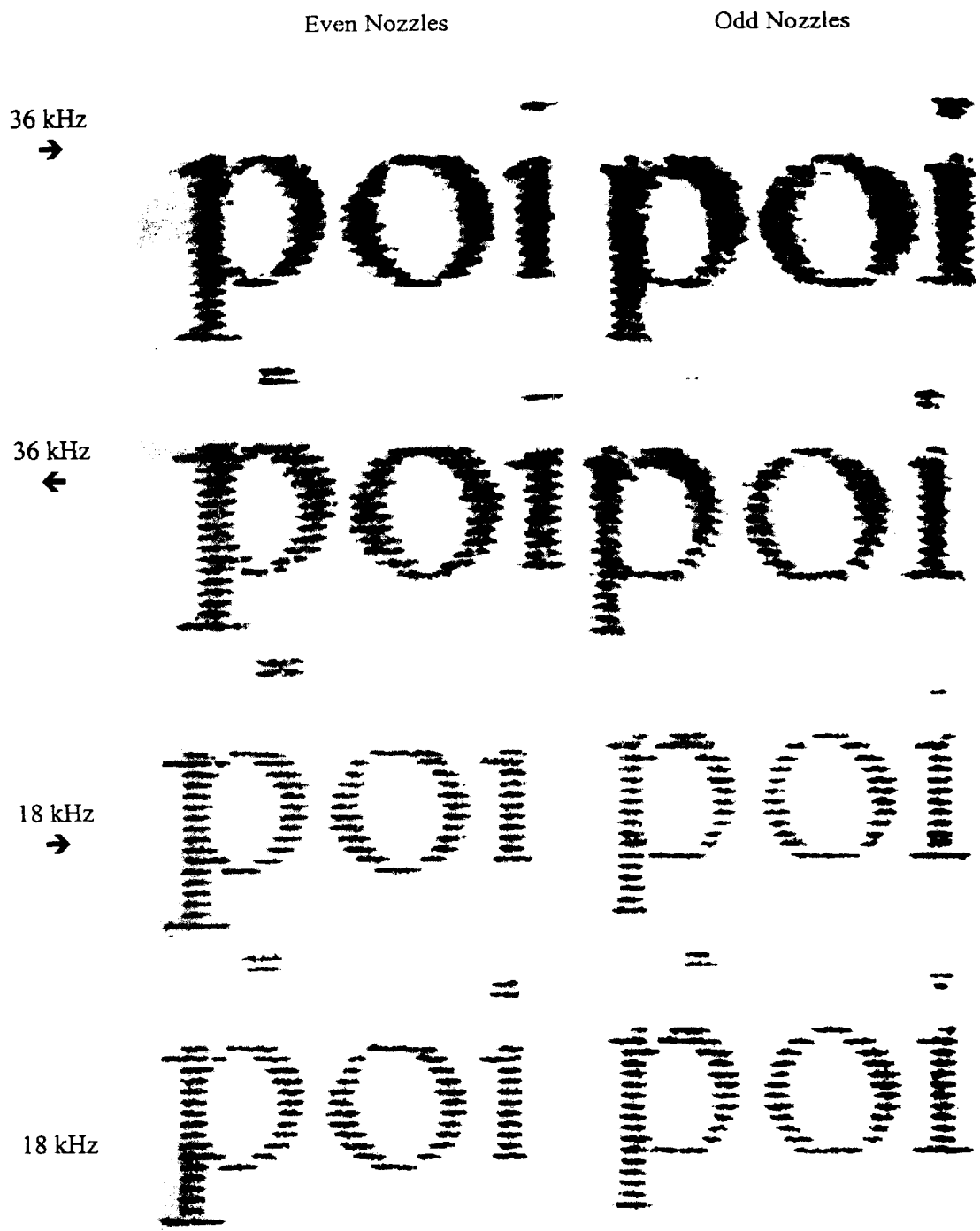
FIG. 8 is a magnified photomicrograph of text printed by a printhead in a single pass of a bi-directional printmode showing images in the left column printed with the even nozzles and images in the right column printed with the odd nozzles.

FIGS. 7 and 8 are photomicrographs of text printed by a printhead in a single pass of a bi-directional printmode at a carriage speed of 30 inches per second. FIG. 7 is at high a magnification and FIG. 8 is at a lower magnification. In both FIGS. 7 and 8, the four images in the left column were printed with the even nozzles 70a and four images in the right column were printed with the odd nozzles 70b.

The effects of scan direction (left-to-right vs right-to-left) and firing frequency (36 kHz vs 18 kHz) can be seen by looking at the edge roughness of the text characters in FIGS. 7 and 8. Spear drops 85 degrade text edge quality at 36 kHz in the left-to-right scan direction for even nozzles 70a (spear drops 85 visible on the left side of text characters) and in the right-to-left direction for odd nozzles 70b (spear drops visible on the right side of text characters). Edge quality is not degraded at 36 kHz for odd nozzles 70b in the left-to-right scan direction or for even nozzles 70a in the right-to-left direction. FIGS. 7 and 8 also illustrate that both even and odd nozzles have good edge quality in either scan direction when printing at 18 kHz.

Figure 9:
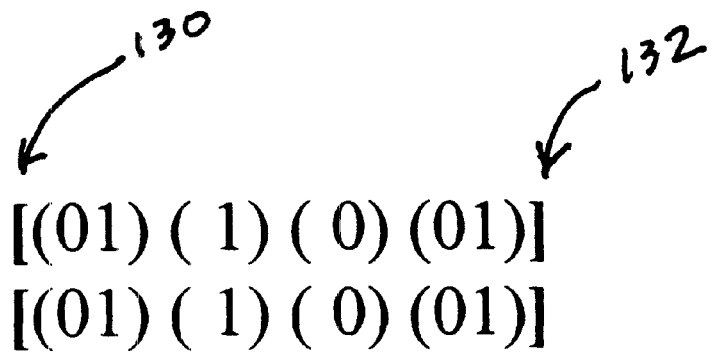
FIG. 9 illustrates a printmask in accordance with one embodiment of the present invention.

To get sufficient color intensity, depending on drop size a particular a particular number of drops are required to be placed in a pixel. In the following embodiment it is assumed that 12 drops are required per 300 dpi pixel. A 300 dpi pixel is printed with a 1200 dpi (horizontal)×600 dpi (vertical) mask. In the mask shown FIG. 9, Each ( ) represents a ¹⁄₁₂₀₀ inch sub-pixel location and each [( )()( )] represents a ¹⁄₃₀₀×¹⁄₃₀₀ inch pixel. The four columns represent the four ¹⁄₁₂₀₀ inch subpixel locations that the printhead can fire into. The two rows correspond to one odd nozzle 70b row and one even nozzle 70a row. A "0" in a ( ) indicates that a drop is fired into this location in pass 0 (printed from left-to-right). A "1" in a ( ) indicates that a drop is fired into this location in pass 1 (printed from right-to-left). Since this is a bi-directional printmask, each pixel can be printed both pass 0 and pass 1. When "01" is in a ( ) it indicates that a drop is fired into this location on both pass 0 and pass 1.

In pass 0 (left-to-right), the left edge 130 of the 300 dpi pixel is printed at 18 kHz and the right edge 132 is printed 36 kHz. As shown in the photomicrographs of FIGS. 7 and 8, the left edge 130 of the pixel will look good because it is printed at 18 kHz and the right edge 132 of the pixel will look good, even though it is printed at 36 kHz, because both odd and even nozzles 70b, 70a, have good right edge 132 quality when printed in the left-to-right scan direction. In pass 1 (right-to-left), the right edge 132 of the 300 dpi pixel is printed at 18 kHz and the left edge 130 is printed 36 kHz. As shown in the photomicrographs of FIGS. 7 and 8, the right edge 132 of the pixel will look good because it is printed at 18 khz and the left edge 130 of the pixel will look good, even though it is printed at 36 kHz, because both odd and even nozzles have good left edge quality in the right-to-left scan direction. Accordingly, line, text and graphics quality is improved by printing with the bi-directional printmask shown in FIG. 9. Using the printmask of FIG. 9, it does not matter where the edges of lines or text characters are located because every 300 dpi pixel has good edge quality.

Figure 10:
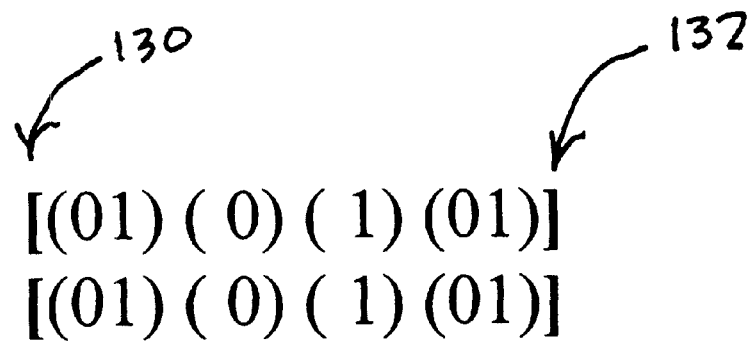
FIG. 10 illustrates a printmask in accordance with another embodiment of the present invention.

Another embodiment of the present invention can be used to hide the effects of low velocity spray and tails. Low velocity spray and tails formed at high firing frequency cause rough edges because they land on the paper downstream from the main drop 84. The printmask shown in FIG. 10 can be used to hide the effects of spray and tails 87. In pass 0 (left-to-right), the left edge 130 of the 300 dpi pixel is the leading edge and is printed at 36 kHz and the right edge 132 is the trailing edge and is printed 18 kHz. In pass 1 (right-to-left), the right edge 132 of the 300 dpi pixel is the leading edge and is printed at 36 kHz and the left edge 130 is the trailing edge and is printed 18 kHz. Using this printmask, the leading edge of a 300 dpi pixel is printed at high frequency (36 kHz) and the trailing edge at low frequency (18 kHz).

The present invention solves the problem of systematic defects by developing specific correction schemes that compensate for the systematic defects by selectively changing printing operations. This increases text, line and graphics quality by reducing edge roughness caused by the defects. An advantage of this invention is that it allows dramatically improved edge roughness and text quality without requiring additional image processing. While the above is discussed in terms of specific and alternative embodiments, the invention is not intended to be so limited. The foregoing techniques of the present invention can be applied to any firing frequency, dots per inch print resolution, number of drops per pixel, or printer carriage speed.

From the foregoing it will be appreciated that the method provided by the present invention represents a significant advance in the art. Although several specific embodiments of the invention have been described and illustrated, the invention is not to be so limited. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for incremental printing with an inkjet swath printer by ejecting drops of an ink from a printhead while scanning the printhead over a print medium, comprising:

determining a first edge and a second edge of each pixel in each row with respect to a first scanning direction;

moving the printhead in the first scanning direction while ejecting the drops of ink on the first edge of the pixels at a first firing frequency and on the second edge of the pixels at a second firing frequency; and moving the printhead in a second direction opposite to the first scanning direction while ejecting the drops of ink on the second edge of the pixels at the first firing frequency and on the first edge of the pixels at the second firing frequency.

2. The method of claim 1 wherein the first firing frequency is two times the second firing frequency.

3. The method of claim 1 wherein the first firing frequency is three times the second firing frequency.

4. The method of claim 1 wherein the first firing frequency is the maximum firing frequency of the printhead.

5. The method of claim 1 wherein the second firing frequency is less than the maximum firing frequency of the printhead.

6. The method of claim 1 wherein the first firing frequency is greater than 40 kHz.

7. The method of claim 1 wherein the first firing frequency is greater than 30 kHz.

8. The method of claim 1 wherein the second firing frequency is less than 30 kHz.

9. The method of claim 1 wherein the second firing frequency is less than 20 kHz.

10. The method of claim 1 further including advancing the media under the printhead.

11. A printing system for ejecting ink drops onto a medium, comprising:

a mechanism for scanning a carriage through a print zone over the medium;

a printhead mounted on the carriage, the printhead having ink firing elements for ejecting an ink; and a controller for determining a first edge and a second edge of each pixel in each row with respect to a first scanning direction; the controller causing the carriage to scan the printhead in a first scanning direction while ejecting the drops of ink on the first edge of the pixels at a first firing frequency and on the second edge of the pixels at a second firing frequency; and the controller causing the carriage to scan the printhead in a second scanning direction opposite to the first scanning direction while ejecting the drops of ink on the second edge of the pixels at the first firing frequency and on the first edge of the pixels at the second firing frequency.

12. The printing system of claim 11 wherein the first firing frequency is twice the second firing frequency.

13. The printing system of claim 11 wherein the first firing frequency is three times the second firing frequency.

14. The printing system of claim 11 wherein the first firing frequency is the maximum firing frequency of the printhead.

15. The printing system of claim 11 wherein the second firing frequency is less than the maximum firing frequency of the printhead.

16. The printing system of claim 11 wherein the first firing frequency is greater than 40 kHz.

17. The printing system of claim 11 wherein the first firing frequency is greater than 30 kHz.

18. The printing system of claim 11 wherein the second firing frequency is less than 30 kHz.

19. The printing system of claim 11 wherein the second firing frequency is less than 20 kHz.

20. The printing system of claim 11 further including a media advance mechanism for passing the media through the print zone under the control of the controller.

* * * * *